US007996135B2

(12) United States Patent
Ishii et al.

(10) Patent No.: US 7,996,135 B2
(45) Date of Patent: Aug. 9, 2011

(54) STARTER

(75) Inventors: Koji Ishii, Mito (JP); Tatsumi Nishida, Mito (JP)

(73) Assignee: Hitachi, Ltd., Tokyo (JP)

( * ) Notice: Subject to any disclaimer, the term of this patent is extended or adjusted under 35 U.S.C. 154(b) by 893 days.

(21) Appl. No.: 11/965,033

(22) Filed: Dec. 27, 2007

(65) Prior Publication Data

US 2008/0162007 A1 Jul. 3, 2008

(30) Foreign Application Priority Data

Dec. 28, 2006 (JP) ................................. 2006-353645

(51) Int. Cl.
*F02N 11/00* (2006.01)
*G06F 19/00* (2006.01)

(52) U.S. Cl. ...... 701/54; 701/113; 123/179.3; 290/38 R; 290/48

(58) Field of Classification Search .................... 701/54, 701/113; 123/179.3, 179.25; 290/38 R, 290/48; 74/6, 7 A, 89.2; 310/66, 68 R, 41, 310/75 R, 83; 318/430
See application file for complete search history.

(56) References Cited

U.S. PATENT DOCUMENTS 4,192,195 A * 3/1980 Kazino et al. .................. 74/7 A
4,502,429 A * 3/1985 Ebihara .................... 123/179.22
4,621,197 A * 11/1986 Tanaka ........................ 290/38 R
4,827,807 A * 5/1989 Hayakawa et al. ............ 477/36
5,471,890 A * 12/1995 Shiga et al. ..................... 74/7 E
5,494,010 A * 2/1996 Niimi et al. .............. 123/179.25
5,522,776 A * 6/1996 Alvey ............................. 477/35
5,525,947 A * 6/1996 Shiga et al. .................. 335/126
5,927,240 A * 7/1999 Maxon ....................... 123/179.3
5,998,895 A * 12/1999 Thrasher et al. ................ 310/83
6,054,777 A * 4/2000 Soh ............................ 290/38 R
6,104,157 A * 8/2000 Kramer et al. ................ 318/445
(Continued)

FOREIGN PATENT DOCUMENTS

DE 10 2004 031 306.7 * 6/2004
(Continued)

OTHER PUBLICATIONS

Mechanical and Electrical Technology (ICMET), 2010 2nd International Conference on; Digital Object Identifier: 10.1109/ICMET.2010.5598478; Publication Year: 2010 , pp. c1-c4 Mechanical and Electrical Technology (ICMET), 2010 2nd Inter. Conf. on; Digital Object Identifier: 10.1109/ICMET.2010.5598478; Pub. Year: 2010 , pp. c1-c4.*

(Continued)

*Primary Examiner* — Cuong H Nguyen
(74) *Attorney, Agent, or Firm* — Crowell & Moring LLP

(57) ABSTRACT

The present invention provides a starter capable of keeping a state where a pinion and a ring gear maintain meshing with each other when an engine stops without providing a plunger stopper using a solenoid or the like. The state where the pinion and the ring gear maintain meshing with each other in the engine stop mode continues by movement resistance which occurs when a torque transmission member moves. Concretely, an inclination angle of a helical spline in a helical spline engagement part is set so that the above state continues. The helical spline engagement part is a part where a helical spline on the outer periphery of an output shaft of a starter motor and a helical spline on the inner periphery of the torque transmission member mesh with each. Consequently, the above state continues without a plunger stopper using a solenoid or the like.

20 Claims, 10 Drawing Sheets

U.S. PATENT DOCUMENTS

| | | | | |
|---|---|---|---|---|
| 6,347,608 | B1 * | 2/2002 | Hara et al. | 123/179.4 |
| 6,364,807 | B1 * | 4/2002 | Koneda et al. | 477/5 |
| 6,380,831 | B1 * | 4/2002 | Kajino | 335/127 |
| 6,746,354 | B1 * | 6/2004 | Ziemer | 475/5 |
| 7,145,259 | B2 * | 12/2006 | Spellman et al. | 290/38 R |
| 2009/0267553 | A1 * | 10/2009 | Labbe et al. | 318/430 |
| 2010/0064786 | A1 * | 3/2010 | Ge et al. | 73/114.25 |
| 2010/0090526 | A1 * | 4/2010 | Itou | 307/10.6 |
| 2010/0126454 | A1 * | 5/2010 | Heusel et al. | 123/179.3 |
| 2010/0193268 | A1 * | 8/2010 | McGee | 180/65.21 |
| 2010/0256897 | A1 * | 10/2010 | Takata et al. | 701/113 |
| 2010/0264765 | A1 * | 10/2010 | Haruno et al. | 310/71 |
| 2011/0048358 | A1 * | 3/2011 | Gaborel et al. | 123/179.25 |

FOREIGN PATENT DOCUMENTS

| | | | |
|---|---|---|---|
| FR | 0852529 | * | 4/2008 |
| JP | 2000-45920 | A | 2/2000 |
| JP | 2006-353645 | * | 12/2006 |
| JP | 2009-090281 | * | 4/2009 |
| JP | 2010-092197 | * | 4/2010 |
| WO | WO00/71887 | * | 11/2000 |
| WO | PCT/EP2005/052093 | * | 5/2009 |
| WO | PCT/CA08/00550 | * | 9/2009 |
| WO | PCT/EP2007/056980 | * | 10/2009 |
| WO | PCT/EP08/51285 | * | 1/2010 |
| WO | PCT/EP08/63791 | * | 11/2010 |

OTHER PUBLICATIONS

Permanent Magnetic Synchronous Motor and drives applied on a mid-size hybrid electric car; Qianfan Zhang; Xiaofei Liu; Vehicle Power and Propulsion Conference, 2008. VPPC '08. IEEE; Digital Object Identifier: 10.1109/VPPC.2008.4677807 Publication Year: 2008 , pp. 1-5.*

New type of starters; Hajek, V.; Kuchynkova, H.; Electrical Machines (ICEM), 2010 XIX International Conference on Digital Object Identifier: 10.1109/ICELMACH.2010.5608207; Publication Year: 2010 , pp. 1-5.*

Application of Dual Mechanical Port Machine in Hybrid Electrical Vehicles; Yuan Zhang; Longya Xu; Vehicle Power and Propulsion Conference, 2006. VPPC '06. IEEE; Digital Object Identifier: 10.1109/VPPC.2006.364304 Publication Year: 2006, pp. 1-5.*

Numerical Simulation and Analysis of Forging Process for Automotive Starter Motor Ring Gear; Ping Wang; Liang Li; Bin Wang; Yi Lian; System Science, Engineering Design and Manufacturing Informatization (ICSEM), 2010 Inter. Conf. on; vol. 2; Digital Object Identifier: 10.1109/ICSEM.2010.167; Pub. Year: 2010 , pp. 296-298.*

Overview of Permanent-Magnet Brushless Drives for Electric and Hybrid Electric Vehicles; Chau, K.T.; Chan, C.C.; Chunhua Liu; Industrial Electronics, IEEE Transactions on; vol. 55 , Issue: 6; Digital Object Identifier: 10.1109/TIE.2008.918403 Publication Year: 2008 , pp. 2246-2257.*

Direct Torque Control System of Permanent Magnet Synchronous Motor for Integrated Starter Generator of Hybrid Electric Vehicles; Zhang Peijie; Tian Yantao; Gong Yimin; Control Conference, 2006. CCC 2006. Chinese; Digital Object Identifier: 10.1109/CHICC.2006.280753; Publication Year: 2006 , pp. 1552-1557.*

* cited by examiner

STARTER

CLAIM OF PRIORITY

The present application claims priority from Japanese application serial no. 2006-353645, filed on Dec. 28, 2006, the content of which is hereby incorporated by reference into this application.

FIELD OF THE INVENTION

The present invention relates to a starter for an internal combustion engine.

BACKGROUND OF THE INVENTION

In recent years, the number of vehicles with an automatic engine stop and start system (it's also so called as an idle stop system) is increasing. The system stops an internal combustion engine automatically to carry out an idle stop when an automobile is stopped and restarts the engine automatically when the automobile is restarted from the idle stop, in order to reduce exhaust gases of vehicles. In a vehicle with the idle stop function, the starter needs to be driven each time the engine is restarted. The starter needs to restart the engine with the following action: when passing current to a magnetic switch for connecting electrically a starter motor and a battery, a pinion is moved toward a ring gear of the engine by the driving force of the electromagnetic switch (actuator); thereby the starter motor is connected to the battery and rotates so that the pinion meshes with the ring gear; and torque of the starter motor is transmitted to a crankshaft of the engine through the pinion gear and ring gear. Consequently, the automatic engine stop and start system has a problem that it takes long time to restart the engine and the vehicle cannot move promptly. Particularly, when the pinion and the ring gear collide with each other before meshing, it takes longer time to restart the engine.

To solve such a problem, a technique described in the patent document 1 (Japanese Patent Laid-open No. 2000-45920) is provided. According to the technique, it makes possible to shorten time to restart the engine by driving a magnetic switch during an automatic engine stop (idle stop mode) and holding a plunger of the magnetic switch with a plunger stopper so as to keep a state of a pinion meshing with a ring gear.

However, in the technique, since the plunger stopper uses a solenoid only for holding the plunger of the magnetic switch, the technique has a problem of low mountability.

An object of the present invention is to provide a starter capable of keeping a state where a pinion and a ring gear remain meshing with each other when an engine automatically is stopped, without a plunger stopper having a solenoid.

SUMMARY OF THE INVENTION

The starter of the present invention is configured to maintain a state where the pinion and the ring gear mesh with each other during an engine stop mode by movement resistance of the torque transmission member, even when the electromagnetic actuator is non-energized.

The starter of the present invention has comprised of a helical spline on the outer periphery of the output shaft and a helical spline on the inner periphery of the torque transmission member; these helical splines are meshed with each other and have inclination angles for making the sliding of the torque transmission member; and the helical splines slide the torque transmission member so as to get apart from the ring gear when the pinion is rotated by driving force from the ring gear. The inclination angles of the helical splines are set so as to maintain a state where the pinion and the ring gear mesh with each other during an engine stop mode, even when the solenoid is non-energized.

In the starter of the present invention, a controller energizes the electromagnetic actuator to move the torque transmission member so that the pinion meshes with the ring gear after rotation of a crankshaft of the engine completely stops. The torque transmission member is configured to maintain a state where the pinion and the ring gear mesh with each other by a reaction of movement of the torque transmission member after the engine is stopped, even when the electromagnetic actuator is non-energized.

In the starter of the present invention, a controller energizes the electromagnetic actuator to move the torque transmission member so that the pinion meshes with the ring gear after the engine is stopped. The engine is set to stop in a state where the pinion meshes with the ring gear and a piston is in a way from a bottom dead center to a top dead center in a compression stroke.

According to the present invention, the state where the pinion and the ring gear remain meshing with each other in the engine stop mode can continue without a magnetic switch employing a new solenoid. Thus, mountability can be improved.

DETAILED DESCRIPTION OF PREFERRED EMBODIMENTS

First Embodiment

Figure 1:
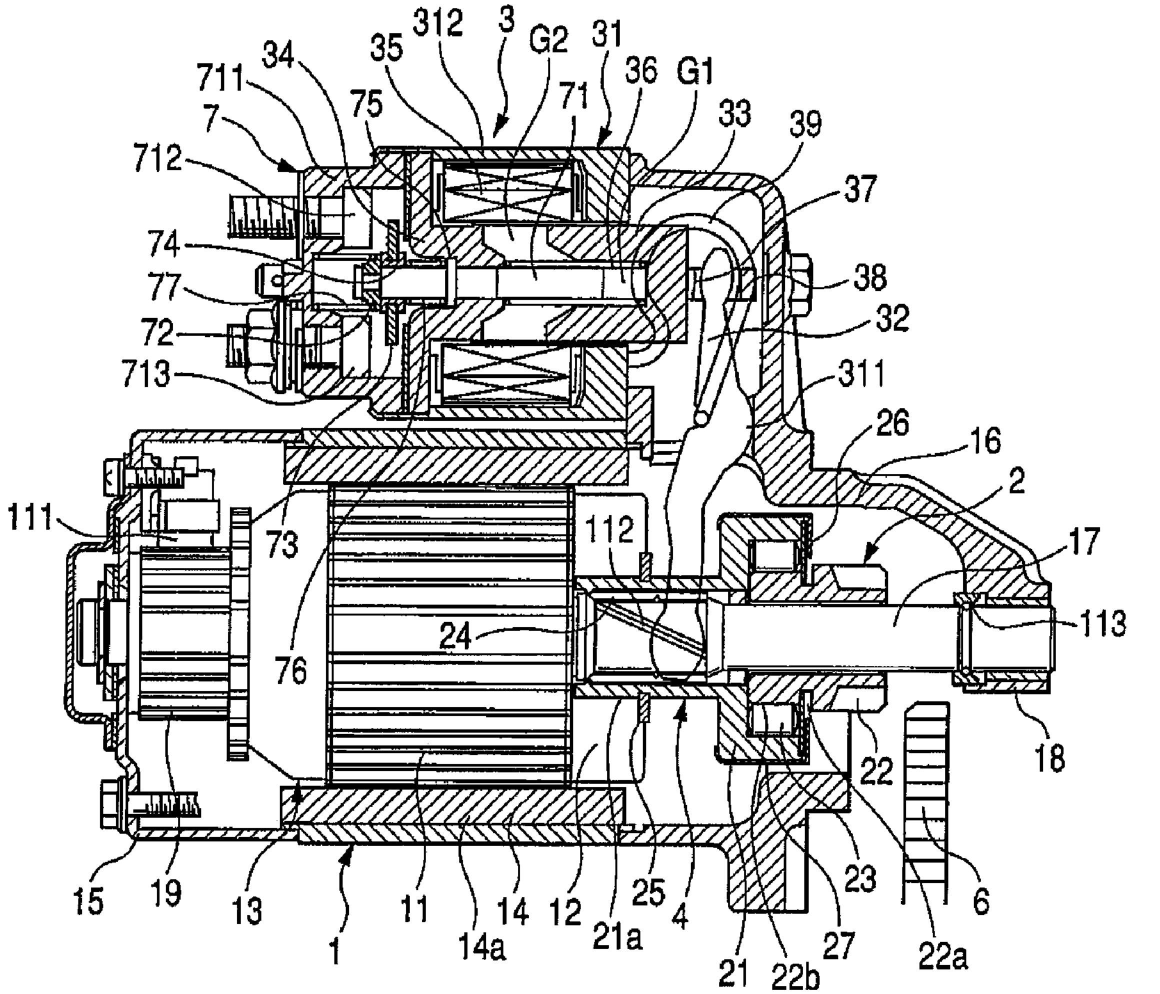
FIG. 1 is a sectional side view of a starter in a state where an engine starts in a first embodiment.
Figure 2:
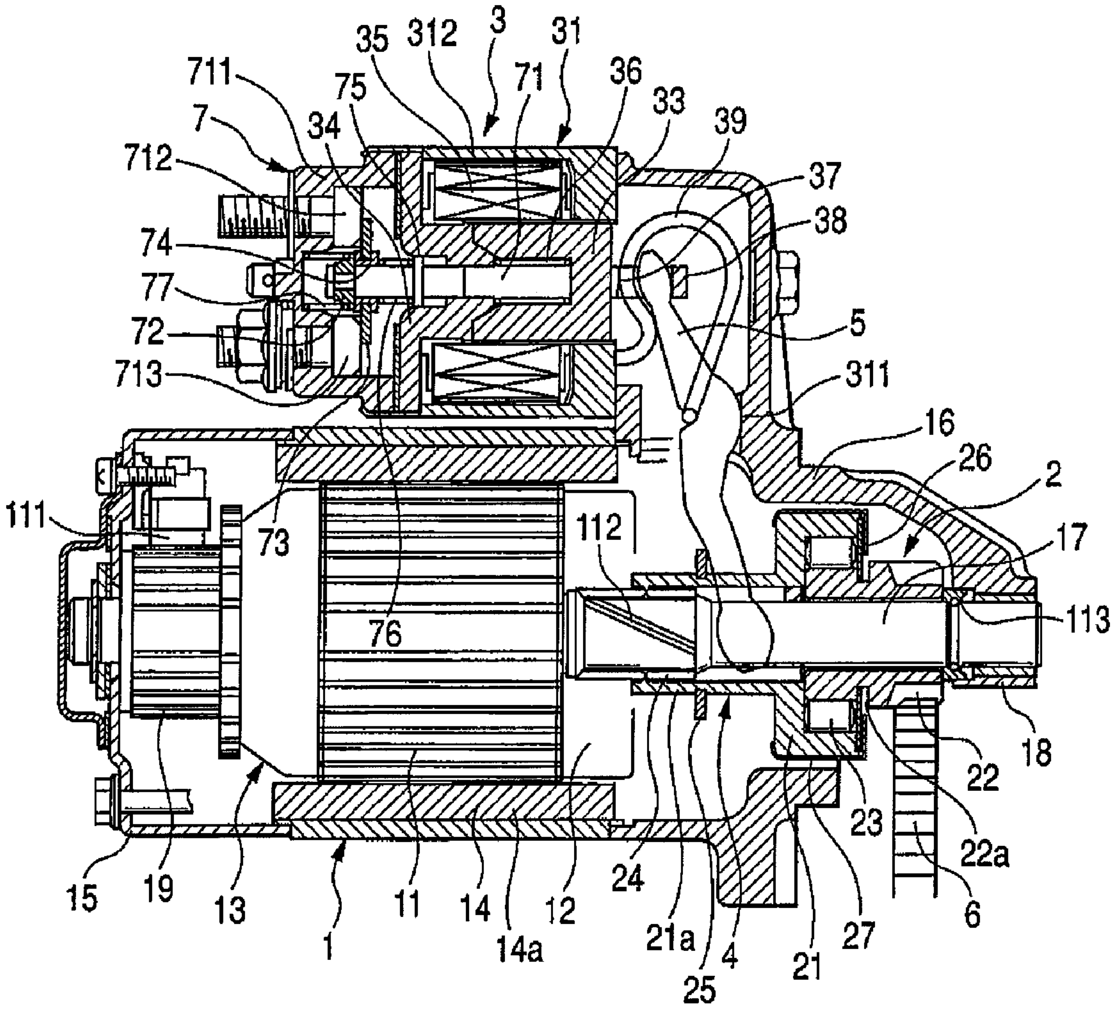
FIG. 2 is a sectional side view of the starter immediately after the engine in the first embodiment stops.
Figure 3:
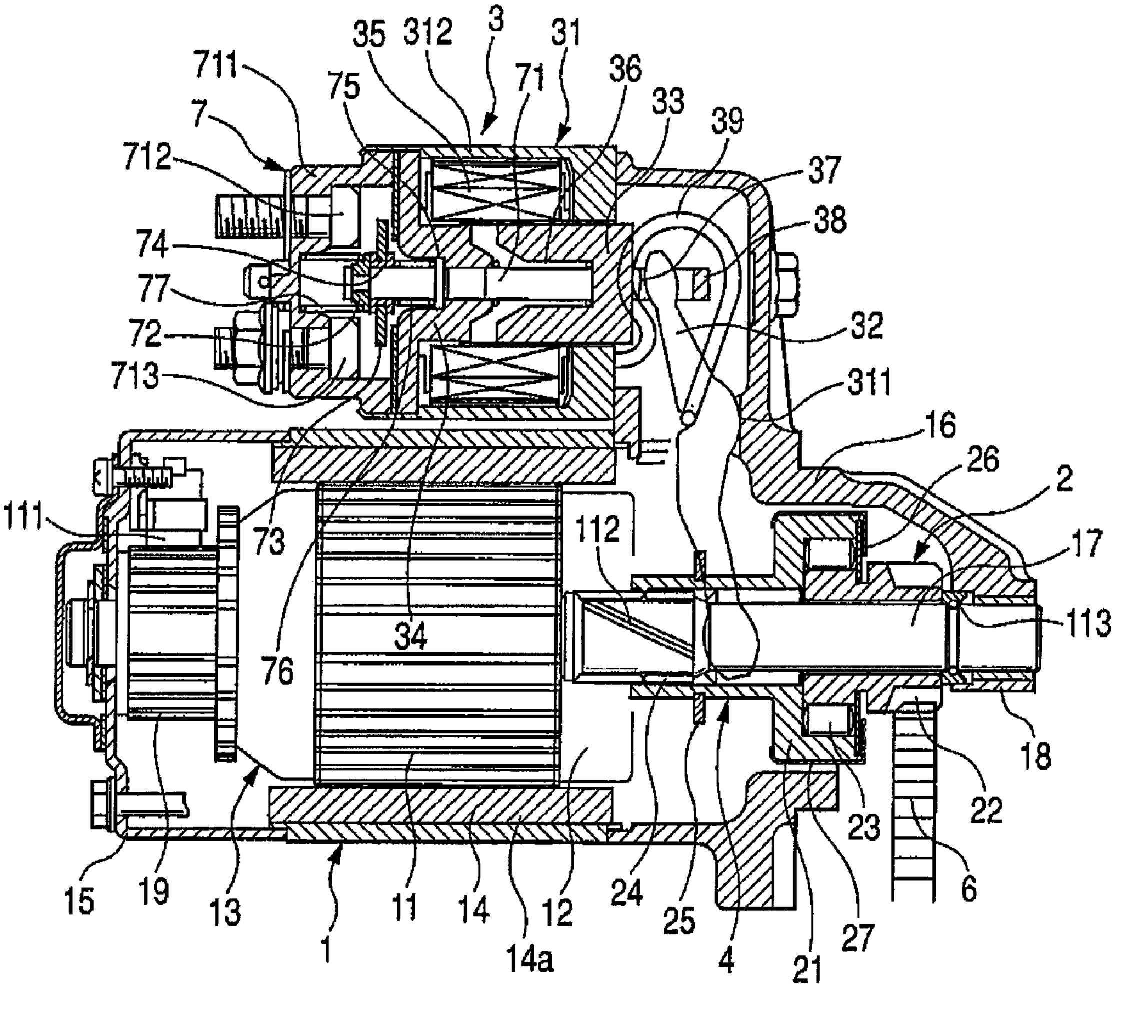
FIG. 3 is a sectional side view of the starter after a lapse of a predetermined time since the engine in the first embodiment stops.
Figure 4:
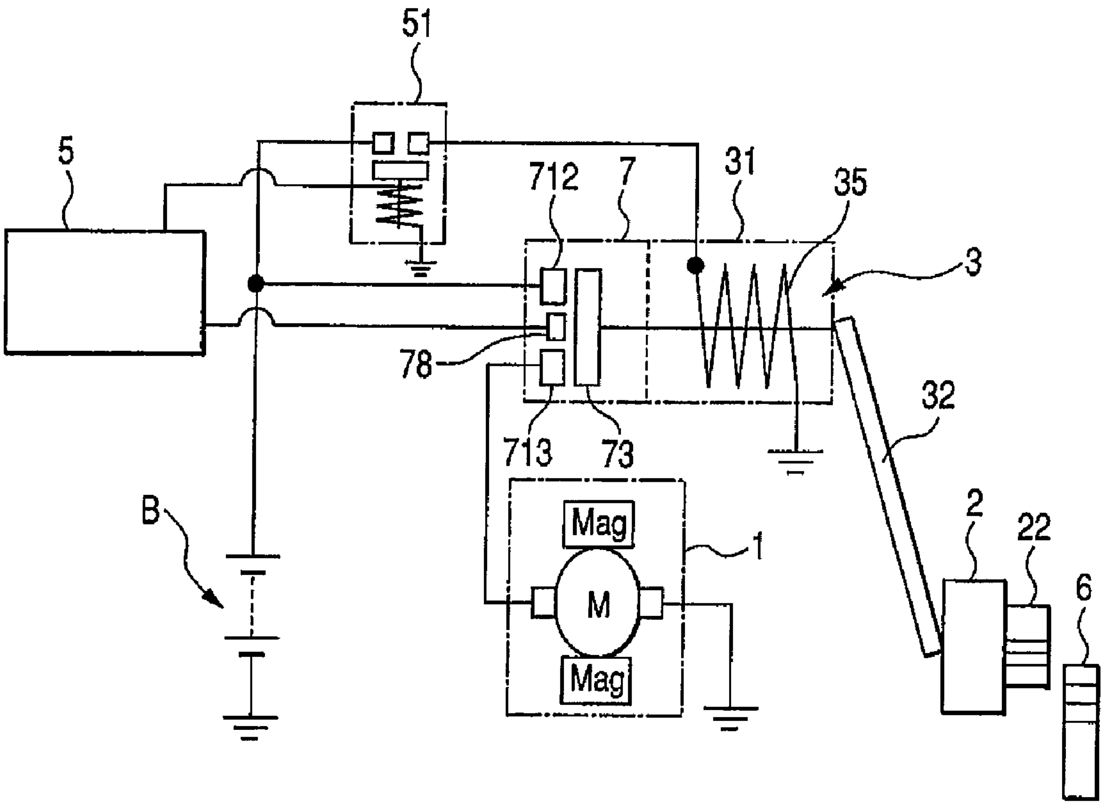
FIG. 4 is a diagram showing a circuit of the starter in the first embodiment.
Figure 5:
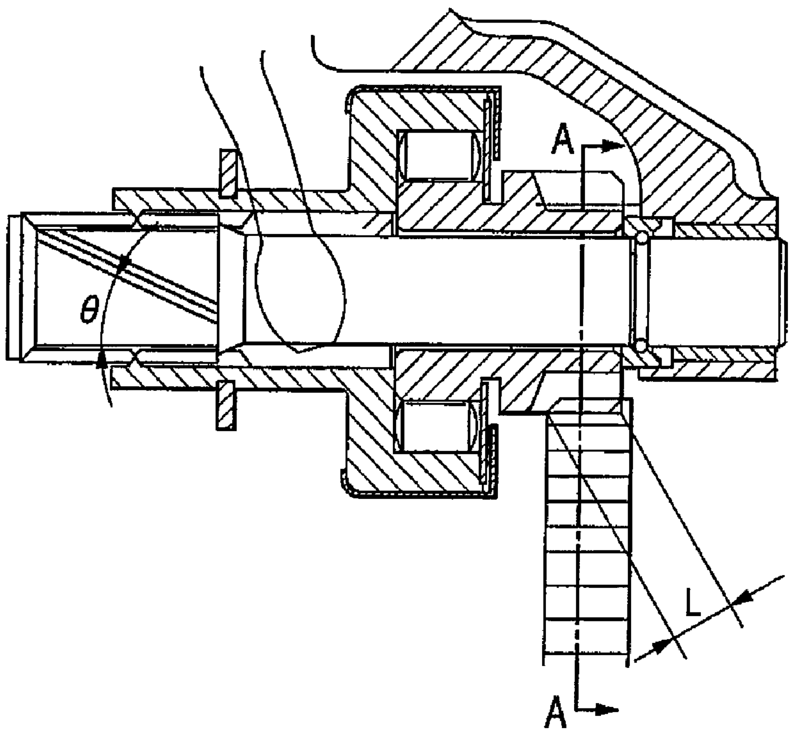
FIG. 5 is an enlarged view of a torque transmission member in the first embodiment.
Figure 6:
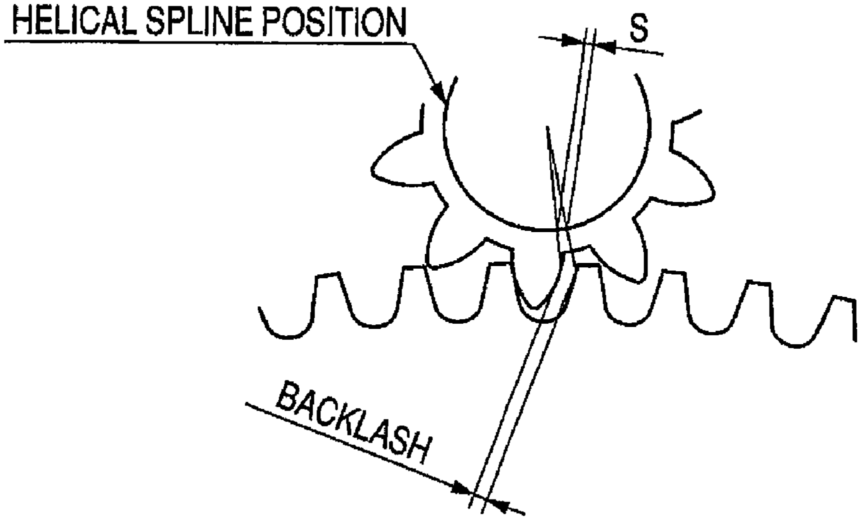
FIG. 6 is a cross section view taken along line A-A of FIG. 5.
Figure 7:
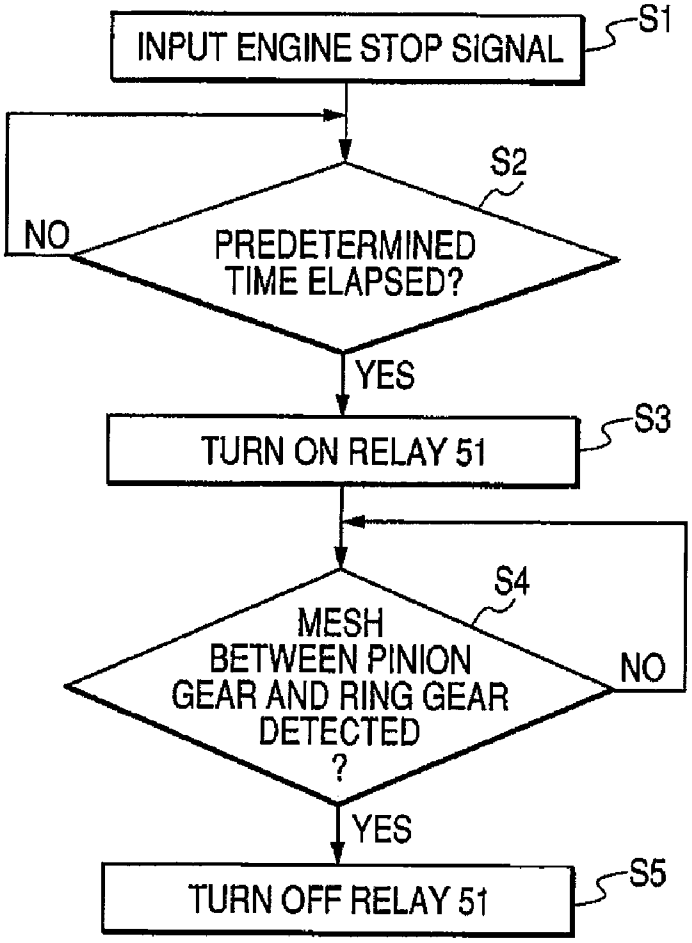
FIG. 7 is a control flowchart after the engine stops in the first embodiment.
Figure 8:
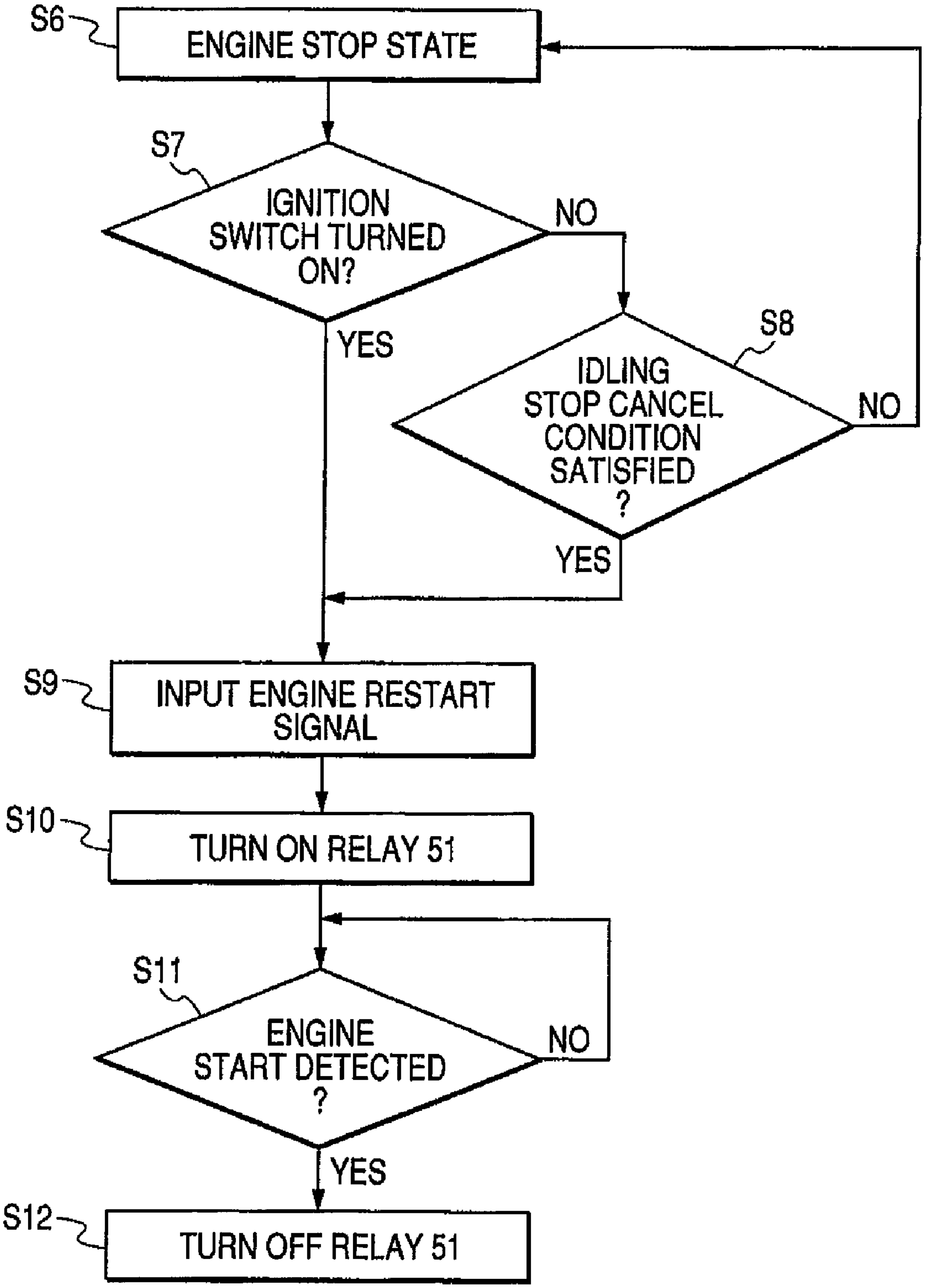
FIG. 8 is a control flowchart when the engine restarts in the first embodiment.

A starter of a first embodiment of the present invention will be described below with reference to FIGS. 1 to 8. FIG. 1 is a sectional side view of a starter in a state where the engine starts. FIG. 2 is a sectional side view of the starter immediately after the engine is stopped. FIG. 3 is a sectional side view of the starter after a lapse of a predetermined time since the engine stops. FIG. 4 is a diagram showing a circuit of the starter. FIG. 5 is an enlarged view of a torque transmission member. FIG. 6 is a cross section view taken along line A-A of FIG. 5. FIG. 7 is a control flowchart after the engine is stopped. FIG. 8 is a control flowchart when the engine restarts.

The starter shown in FIGS. 1 to 3 receives power supplied from a battery mounted on a vehicle and generates torque for starting the engine. The vehicle with the starter of this embodiment has an idle stop function. The idle stop function is to automatically stop the engine when the vehicle is stopped in a state where the number of revolutions of the engine becomes that of the idling engine for a predetermined time. The vehicle with such an idle stop function needs to restart the engine each time the vehicle restarts from an idle stop, resulting that the frequency of driving the starter of the vehicle with the idle stop function is much higher than that of a general vehicle without it.

The starter includes a starter motor 1 for generating torque at the time of starting the engine, a torque transmission member 2 for transmitting and interrupting torque from the starter motor 1 to the engine, an electromagnetic actuator 3 for actuating the torque transmission member 2 to transmit the torque as rotational driving force to the engine, a disengaging mechanism 4 for operating not to allow the torque transmission member 2 to transmit the torque from the starter motor to the engine, and a controller 5 for controlling the electromagnetic actuator 3.

As the starter motor 1, a direct current motor is used. The starter motor 1 is comprised of: a rotor 13 constructed by winding an armature coil 12 of plural phases in a plurality of slots 11 formed in the circumferential direction of the rotor core; a stator 14 which is disposed around the outer periphery of the rotor 13. The stator 14 includes a cylindrical yoke 14*a* as a stator core and a plurality of permanent magnets disposed on the inner surface of the yoke 14*a* so as to form different magnetic poles alternately in the circumferential direction of the yoke 14*a*.

As shown in FIG. 1, a cylindrical rear bracket 15 with an end wall is attached at one end side in the axial direction of the yoke 14*a*. A front bracket 16 is attached at the other end side in the axial direction, and a part of which projects and has an opening for engaging and disengaging the pinion 2 to the ring gear 6.

The rotor 13 is provided with an output shaft 17 so as to rotate together with the rotor. One end of the output shaft 17 is rotatably supported by a front bearing 18 provided at the projected part of the front bracket 16. The other end of the output shaft 17 is rotatably supported by a rear bearing (not shown in FIGS) at the rear bracket side. The rear bearing is provided in a holding part that projects toward the front bracket 16 from the end wall of the rear bracket 15 to the inner side of the rotor 13. The front bearing 18 and the rear bearing are comprised of bush bearings.

On the peripheral of the rear bearing supporting the output shaft 17, a commutator 19 which is divided in a plurality of parts in the circumferential direction is provided. A brush 111 is held with a brush holder fixed to the rear bracket 15 in contact with the commutator 19. The brush 111 is electrically connected to a vehicle-mounted battery B, and the commutator 19 is connected to the armature coil 12, so that current can be supplied from the battery B to the armature coil 12 via the brush 111 and the commutator 19. Consequently, plural magnetic poles are also formed on the rotor 13 in the circumferential direction.

The front bracket 16 side of the output shaft 17 extends to the front bearing 18, and a first helical spline 112 is formed on the outer surface from one end in the axial direction of the rotor 13 for a predetermined length. Further, an annular groove is formed so as to be adjacent to the front bearing 18 on the front end side of the output shaft 17. An annular stopper 113 is fixed to the annular groove with a C ring.

The torque transmission member 2 will now be described below. The torque transmission member 2 includes a sleeve 21, a pinion 22 and a one-way clutch. The sleeve 21 and the pinion 22 are provided on the outer periphery of the front bracket 16 side of the output shaft 17. The one-way clutch is made of members such as a roller 23 etc. provided between the sleeve 21 and the pinion 22.

The inner surface of a part of the sleeve 21 is provided with a second helical spline 24 so as to mesh with the first helical spline 112. The second helical spline 24 is formed from one end on the rotor 13 side for a predetermined length in the axial direction. A helical spline engagement part is constructed by the first helical spline 112 and the second helical spline 24. An annular groove 21*a* is formed on the outer periphery of the sleeve 21 and located at a point corresponding to one end of the front bracket 16 side in the second helical spline 24. A flange 25 is fit to the annular groove 21*a*. The sleeve 21 has a large diameter part on the pinion 22 side. A clutch housing space capable of housing the one-way clutch is formed inside of the large-diameter part. The sleeve 21 can move in the axial direction on the output shaft 17 while being twisted along the helical spline engagement part.

The pinion 22 as well as the sleeve 21 has a through hole for the output shaft 17 so as to be able to move in the axial direction on the output shaft 17. A gear part of the pinion 22 is formed on one end side (front bearing 18 side) in the axial direction of the pinion 22. Most of a gearless part 22*b* of the pinion 22, which is located on the other end side (rotor 13 side) in the axial direction of the pinion 22, is inserted into the clutch housing space of the sleeve 21. An annular groove 22*a* is formed on the gearless part 22*b* of the pinion 22. The annular groove 22*a* is located at a point corresponding to a mouth of the large diameter part of the sleeve 21. An inside part of a ring plate 26 is inserted into the annular groove 22*a* and an outside part of the ring plate 26 is fixed at an end of the large diameter part of the sleeve 21 by being sandwiched between the end of the sleeve 21 and a cover plate 27 as a fixing member 27. The fixing member (cover plate) 27 is attached onto the outer periphery of the large-diameter part of the sleeve 21. With the above-mentioned attachment of the ring plate 26, the pinion 22 and the sleeve 21 can move together in the axial direction on the output shaft 17. When the pinion 22 and the sleeve 21 move together to the front bearing 18 for the predetermined distance, the pinion 22 meshes with a ring gear 6 which is coupled to the crankshaft of the engine. The movement of the pinion 22 in the axial direction is stopped by coming into contact with the stopper 113 fixed to the output shaft 17. Further, a sensor 78 is provided for sensing whether or not the pinion 22 comes into contact with the stopper 113, that is, whether or not the pinion gear meshes with the ring gear 6. When the pinion 22 comes into contact with the stopper 113, a signal is output to the controller 5. The inclination angle of teeth of the helical spline engagement part are set so that the torque of the output shaft 17 can be transmitted to the ring gear 6 in the state where a movement of the torque transmission member 2 is stopped in the axial direction with the stopper 113.

A one-way clutch is constructed between the gearless part 22*b* of the pinion 22 and the sleeve 21 by inserting various parts such as the roller 23 etc. for providing a one-way clutch function. Consequently, rotation can be transmitted from the sleeve 21 to the pinion 22 in the torque direction of the output shaft 17, but cannot be transmitted in the opposite direction. With such a configuration, when the number of revolutions of the ring gear 6 exceeds that of the pinion 22, the torque from the ring gear 6 is not transmitted to the sleeve 21. However, the sleeve 21 rotates at low speed as the pinion 22 rotates is because some sliding resistance also acts in a state where the one-way clutch creates sliding so as not to transmit rotation of the ring gear 6. Consequently, the sleeve 21 and the pinion 22 move so as to leave from the ring gear 6 by the action of the helical spline engagement part, thereby the gear part of the pinion gear is disengaged from the ring gear 6. In such a manner, the disengaging mechanism 4 is constructed by the helical spline engagement part and the one-way clutch for disengaging the pinion 22 and the ring gear 6 when the number of revolutions of the ring gear 6 exceeds that of the pinion 22.

Next, the electromagnetic actuator 3 will be described. The electromagnetic actuator 3 is composed of a solenoid mechanism 31 and a shift lever 32. The solenoid mechanism 31 is disposed adjacent and almost in parallel to the starter motor 1, and includes a plunger as a movable core 33, as a stationary core 34, and a solenoid 35. The plunger 33 is formed in a cylindrical member with an end wall in the axial direction thereof. The plunger 33 has a taper part at one end side thereof. The diameter of the taper part increases toward the one end face opposite to the end wall of the plunger 33 in the axial direction. In the hollow of the plunger 33, a first coil spring 36 is inserted as a spring for returning the plunger 33 to the shift lever 32 side. On the outside in the axial direction of the end wall in the plunger 33, a lever insertion part 38 with a lever insertion hole 37 is fixed so as to be able to move together with the plunger 33. A part on one end side of the shift lever 32 is inserted freely with an clearance into the lever insertion hole 37. The middle point as a fulcrum 311 of the shift lever 32 is pressed against the inner wall of the front bracket 16 with a spring 39. A part on the other end side of the shift lever 32 straddles on the outer periphery of the sleeve 21 between the flange 25 and an end wall (the rotor 13 side) of the large diameter part of the sleeve 21. When the plunger 33 is attracted to the stationary core 34 side, the other end side part of the shift lever 32 pushes the end wall of the large diameter part of the sleeve 21 in the axial direction by lever action. Thereby, the sleeve 21 and pinion 22, namely the torque transmission member 2, can be moved toward the ring gear 6 side. In the shift lever 32, the part inserted in the lever insertion hole 37 and the part straddling on the sleeve 21 are formed like an elliptic arc shape.

The solenoid 35 wound around a bobbin made of nonmagnetic material such as resin is disposed around the outer periphery of plunger 33. The solenoid 35 is housed in a cylindrical yoke 312 made of magnetic material. An end wall of the cylindrical yoke 312 is provided with a through hole for movement of the plunger 33, and the plunger 33 is slidably inserted in the hole and the inner periphery of the bobbin.

The stationary core 34 is fixed to the other end side opposite to the end wall of the yoke 312 in the axial direction. The center portion (boss) of stationary core 34 has a tapered projection toward the plunger side 33 in the inner periphery of the solenoid 35. A flange part of the stationary core 34 is fit into a step portion formed at an end portion of a yoke 312. The tapered projection almost matching the tapered part of the plunger 33 is provided at the end of the boss 34. The boss of the stationary core 34 is provided with insertion hole for a rod (contact rod) 71 with an electrical contact 71 described later. The contact rod 71 is inserted freely through the insertion hole of the boss of the stationary core 34. The first coil spring 36 for returning the plunger 33 is provided between the plunger 33 and the stationary core 34, and which is disposed around the outer periphery of the rod 71 so that a part of the spring 36 is inserted into the hollow of the plunger 33.

A magnetic switch 7, which is used to switch between a conduction state and a non-conduction state of the starter motor 1 and the battery B, will be described below. The magnetic switch 7 is actuated by the electromagnetic actuator 3. Concretely, the magnetic switch 7 has the contact rod 71 inserted the tapered projection (boss) of the stationary core 34 so as to be slidable with respect to the stationary core 34. The contact rod 71 also is inserted in the hollow (insertion hole) in the plunger 33, and the first coil spring 36 is disposed around the contact rod 71. At the end side opposite to the plunger 33 in the contact rod 71, a circular-shaped first spring bearing 72 is fixed by caulking. A step is formed in the first spring bearing 72 to have a large-diameter part and a small-diameter part. On the plunger 33 side of the first spring bearing 72, a ring-shaped movable contact 73 made of conductive material is disposed so as to serve as the contact. A second spring bearing 74 is fixed to the inner periphery of the movable contact 73. The second spring bearing 74 is movable in the axial direction on the outer periphery of the contact rod 71 together with the movable contact 73.

A second coil spring 76 is provided between the second spring bearing 74 and a flange 75 formed on the contact rod 71. When no load acts on the movable contact 73, the movable contact 73 and the second spring bearing 74 are pressed against to the first spring bearing 72 side by the second coil spring 76. When a load acts on the movable contact 73 toward the plunger 33 in the axial direction, the movable contact 73 and the second spring bearing 74 move on the contact rod 71 in the axial direction against the force of the second coil spring 76. A third coil spring 77 is provided between the first spring bearing 72 and a contact case 711 described later so as to energize the contact rod 71 toward the plunger 33 side.

A switch unit will now be described. It is provided with a fixed contact with which the movable contact 73 comes into contact. The switch unit is composed of a contact case 711 caulked together with the boss 34 at the open end of the yoke 312, a battery-side fixed contact 712 connected to the battery B fixed to the contact case 711, and an electric motor-side fixed contact 713 connected to the armature coil 12 of the starter motor 1.

The contact case 711 is formed in cylindrical shape with an end wall and made of resin material which is nonmagnetic and insulated. In an almost center position of the contact case 711, a circular-shaped recessed seating part is provided to insert one end of the third coil spring 77. At an inner edge of the opening of the seating part, a tapered face is formed for assisting insertion and bending of the third coil spring 77.

An electric circuit of the starter will be described with reference to FIG. 4. A relay 51 is provided between the battery B and the solenoid 35 for switching between the conduction state and the non-conduction state of the battery B and the solenoid 35. The relay 51 operates according to an output signal from the controller 5. The battery B is also connected to the battery-side fixed contact 712 in the magnetic switch 7. Movement of the movable contact 73 connects the battery-side fixed contact 712 to the electric motor-side fixed contact 713. Since the electric motor side fixed contact 713 is connected to the armature coil 12 of the starter motor 1, when the battery-side fixed contact 712 and the electric motor-side fixed contact 713 get connected to each other, current is supplied from the battery B to the armature coil 12 to drive the starter motor 1.

The operation of the starter will be described below. First, when the engine in the operating state, since the relay 51 in FIG. 4 is in the non-conduction state, no current is supplied to the solenoid 35 and attraction does not act on the plunger 33. Consequently, the plunger 33 is energized by the first coil spring 36 so as to be apart from the stationary core (boss) 34 as shown in FIG. 1. Therefore, one end of the lever 32, which is inserted in the lever insertion hole 37 in the lever insertion part 38 fixed to the plunger 33, is pushed up to the original place (front bracket side) by the plunger 33. The other end of the lever 32 is apart from the large-diameter part in the sleeve 21 of the torque transmission member 2. As a result, force for moving the torque transmission member 2 toward the ring gear 6 side does not act. In this state, since the contact rod 71 is set so as to be apart from the plunger 33, the contact rod 71 is pushed toward the plunger 36 by the third coil spring 77, flange 75 comes in contact with the stationary core 75. Thereby the contact rod 71 projects from the stationary core 34 at maximum projection amount. The movable contact 73 is also apart from the battery-side fixed contact 712 and the electric motor-side fixed contact 713. Therefore, no current is supplied to the armature coil 12 of the starter motor 1. Incidentally, in this state shown in FIG. 1, a gap G1 between one end of the contact rod 71 and the inside of the end wall of the plunger 33 is set to be smaller than a gap G2 between the stationary core 34 and the plunger 33.

The engine is stopped in the following two cases. One case is that in which an ignition switch is turned off. Another case is that in which an idle stop condition (a condition of automatic engine stop) is satisfied. The condition of the latter is that the engine speed continues the idling speed for a predetermined time from when the vehicle is stopped. In the case of the idle stop, a signal is input to the controller 5 to stop the engine in step S1 in FIG. 7 and the program advances to step S2.

In step S2, it is determined whether a predetermined time required to completely stop the engine has elapsed or not. If the predetermined time has elapsed, the program advances to step S3, where a signal for making the relay 51 conductive is output from the controller 5 to conduct between the battery B and the solenoid 35. Consequently, a magnetic flux is generated in the yoke 312, the stationary core 34, and the plunger 33 around the solenoid 35. As shown in FIG. 2, the plunger 33 overcomes the force of the first coil spring 36 and is attracted toward the stationary core 34. When the plunger 33 moves for a predetermined amount of stroke, the plunger 33 comes into contact with the contact rod 71, and the plunger 33 moves toward the stationary core (boss) 34 together with the contact rod 71.

When the contact rod 71 moves toward the stationary core 34, the movable contact 73 also moves until it comes into contact with both the battery-side fixed contact 712 and the electric motor-side fixed contact 713, while contracting the third coil spring 77 in cooperation with the contact rod 71. Also, after the movable contact 73 comes into contact with both the battery-side fixed contact 712 and the electric motor-side fixed contact 713, the plunger 33 and the contact rod 71 move while contracting the second coil spring 76, and stop at the time when the plunger 33 comes into contact with the stationary core 34 as shown in FIG. 2. At this time, the movable contact 73 can come into contact with both the battery-side fixed contact 712 and the electric motor-side fixed contact 713 with sufficient press force since the spring force acts by contracting the second coil spring 76.

Further, when the plunger 33 moves toward the stationary core 34, the swing force around the fulcrum 311 acts on the lever 32 inserted in the lever insertion hole 37 in the lever insertion part 38 fixed to the plunger 33. Consequently, the torque transmission member 2 side of the lever 32 comes into contact with the end wall of the large diameter part in the sleeve 21 so as to move the torque transmission member 2 toward the ring gear 6 side on the output shaft 17 of the starter motor 1. The torque transmission member 2 moves toward the ring gear 6 while being twisted by the helical spline engagement part made by both the first helical spline 112 provided on the output shaft 17 and the second helical spline 24 provided on the inner side of the sleeve 21.

When the positions of the teeth of the ring gear 6 and those of the pinion 22 match each other, the ring gear 6 meshes with the pinion and the torque transmission member 2 stops with the one end surface of the pinion 22 being in contact with the stopper 113. However, when they do not match, the torque transmission member 2 stops with the pinion 22 pressed against the one end surface of the ring gear 6. Since the sensor 78 is provided for sensing whether the pinion 22 is in contact with the stopper 113 or not, in the case where the pinion meshes with the ring gear 6, a signal is output to the controller 5 and the mesh between the pinion gear and the ring gear 6 is sensed in step S4. When a signal indicating that the pinion meshes with the ring gear 6 is input to the controller 5, the relay 51 is immediately turned off in step S5 to stop supplying current to the solenoid 35. On the other hand, when the above signal is not input to the controller 5, the current is continuously supplied to the solenoid 35.

As described above, when the signal indicating that the pinion meshes with the ring gear 6 is not output, the battery-side fixed contact 712 and the electric motor-side fixed contact 713 are in a conducting state via the movable contact 73. Consequently, current passes through the armature coil 12 of the starter motor 1, and the rotor 13 and the output shaft 17 rotate. At this time, the pinion 22 also rotates together with the output shaft 17. However, since the torque transmission member 2 including the pinion 22 is pressed against the ring gear 6 by the lever 32, just at the time when the teeth of the pinion and those of the ring gear 6 match with each other, the pinion 22 moves in the axial direction until it comes into contact with the stopper 113. Sleeved on the above action, the signal indicating that the pinion gear meshes with the ring gear 6 is output from the sensor 78 to the controller 5. The program immediately advances to step S5 and the relay 51 is turned off to stop supplying current to the solenoid 35. When the current supply to the solenoid 35 stops, the movable contact 73 gets apart from the battery-side fixed contact 712 and the electric motor-side fixed contact 713 as shown in FIG. 3. Consequently, a state between the battery B and the armature coil 12 becomes nonconductive and the starter motor 1 stops rotating.

At this time, the plunger 33 moves so as to be apart from the stationary core 34 by the spring force of the first coil spring 36. With the movement, the lever 32 comes into contact with the flange 25 and force for returning the torque transmission member 2 acts to toward the rotor 13. However, the inclination angle of the helical teeth, which are in the helical spline engagement part between the torque transmission member 2 and the output shaft 17 of the starter motor 1, is set to an angle at which the torque transmission member 2 does not move. Consequently, the torque transmission member 2 does not move and the pinion 22 remains meshing with the ring gear 6.

A method of setting the inclination angle θ of the helical teeth in the helical spline engagement part will be described with reference to FIGS. 5 and 6. When L denotes the length of mesh between the pinion 22 and the ring gear 6 and S denotes a distance in which the torque transmission member 2 can move by a backlash between the pinion 22 and the ring gear 6, the inclination angle θ may be set so as to satisfy the condition of $L>S/\tan\theta$. To keep the torque transmission member 2 remain meshing, the inclination angle of the helical teeth needs to be set in consideration of the cogging torque of the starter motor 1, movement resistance, such as frictional force of the sliding parts, and reaction force As described above, even when current for supplying to the solenoid 35 stops, the pinion 22 and the ring gear 6 remain meshing. However, as shown in FIG. 3, since a predetermined clearance is provided between the lever 32 and the lever insertion hole 37 in the lever insertion part 38 provided integrally with the plunger 33, the plunger 33 is slightly moved back for the clearance by the first spring coil 36 from the state of FIG. 2. Accordingly, the contact rod 71 is also moved back. Therefore, the movable contact 73 comes to separate from the battery-side fixed contact 712 and the electric motor-side fixed contact 713, and the state between the battery B and the solenoid 35 becomes nonconductive. That is, in a state where the engine stops, the pinion 22 and the ring gear 6 remain meshing, but no current is supplied to the solenoid 35 and the armature coil 12.

When the engine restarts from the stop state (idle stop), since the pinion 22 and the ring gear 6 mesh with each other, the movable contact 73 immediately comes into contact with the battery-side fixed contact 712 and the electric motor-side fixed contact 713, thereby supplying current to the armature coil 12 and rotate the starter motor 1.

The processes for the engine to restart from a stop state will be described with reference to the flowchart of FIG. 8. The engine is at a stop in step S6. It is determined in step S7 whether or not the ignition switch is turned on. If the ignition switch is turned on, the program advances to step S9, where a signal to restart the engine is input to the controller 5. If the ignition switch is not turned on in step S7, the program advances to step S8 and it is determined whether a condition to cancel idle stop is satisfied. If the condition is satisfied, the program advances to step S9. If the condition is not satisfied, the program returns to step S6, where the engine remains stopping. The conditions to cancel the idle stop are when a brake is released and an accelerator is pressed, or additionally when press on the clutch pedal is sensed in the case of a vehicle having a clutch pedal.

When the signal to restart the engine is input to the controller 5 in step S9, the program advances to step S10, where the relay 51 is turned on. Consequently, the movable contact 73 immediately comes into contact with the battery-side fixed contact 712 and the electric motor-side fixed contact 713, thereby supplying current to the armature coil 12 and making the starter motor 1 rotate.

The program advances to step S11 and whether the engine has started or not is determined. When a signal indicating that the engine has started is transmitted to the controller 5, the program advances to step S12, where the relay 51 is turned off, and no current is supplied to the solenoid 35 and the armature coil 12. When the signal is not transmitted to the controller 5, relay 51 remains turned on. As for the means to determine whether the engine has started or not in step S11, sensing the engine speed is employed, for example. When the engine speed continues to be equal to a predetermined one or more for a predetermined time, the engine is determined to have started.

The rotational speed of the ring gear 6 may exceed that of the starter motor 1 when the engine starts, and the rotation is absorbed by the one-way clutch provided for the torque transmission member 2, so that the torque in the direction opposite to the driving direction of the output shaft 17 is not transmitted to the output shaft 17.

However, even when the rotation from the pinion 22 is absorbed by the one-way clutch, the slightly rotation is also transmitted to the sleeve 21 in association with the rotation of the pinion 22 due to sliding resistance in the sliding part of the one-way clutch. Consequently, the sleeve 21 and the pinion 22 move toward the rotor 13, thereby the pinion 22 gets apart from the ring gear 6 according to the inclination direction of the helical spline engagement part, so that ring gear 6 and the pinion 25 disengage from each other. As described above, the disengaging mechanism for the mesh of the pinion 22 and the ring gear 6 is constructed by the helical spline engagement part.

In sum, The main points and advantages of the first embodiment will be described below.

The first embodiment relates to a starter for an engine, comprising:

a starter motor whose output shaft is rotated by current supplied;

a torque transmission member with a pinion for transmitting torque from an output shaft of the starter motor to a ring gear of the engine, and which is capable of transmitting and interrupting the torque by moving the pinion so as to mesh with and disengage from the ring gear;

an electromagnetic actuator for moving the torque transmission member to a place where the pinion meshes with the ring gear when current is supplied;

a disengaging mechanism for applying a driving force to the torque transmission member so that the torque transmission member moves to a place where the pinion is disengaged from the ring gear when the number of revolutions of the ring gear exceeds that of the torque transmission member; and a controller for energizing the electromagnetic actuator to move the torque transmission member so that the pinion meshes with the ring gear after the engine is stopped, wherein the torque transmission member is configured to maintain a state where the pinion and the ring gear mesh with each other during an engine stop mode by movement resistance of the torque transmission member, even when the electromagnetic actuator is non-energized. Therefore, the starter can start the engine promptly and cost less since it does not need a newly provided electric motor having a plunger stopper. Further, mountability to a vehicle also can be improved since the starter itself is not provided with a plunger stopper.

The torque transmission member is comprised of: the pinion mounted around an outer periphery of the output shaft of the starter motor; a sleeve mounted around the outer periphery of the output shaft so as to be able to move in an axial direction while rotating together with the output shaft; and a one way clutch which is interposed between the sleeve and the pinion to transmit the torque only in a one-way rotational direction from the sleeve to the pinion, and wherein, when the number of revolutions of the ring gear exceeds that of the torque transmission member, low torque is also transmitted from the pinion to the sleeve by sliding resistance in the one-way clutch. Consequently, even when the number of revolutions of the ring gear exceeds that of the pinion, large force opposite to the driving direction does not act on the output shaft of the starter motor.

The electromagnetic actuator is driven with a magnetic switch for switching between a conduction state and a non-conduction state of the starter motor and the battery. Therefore, the starter does not need an electromagnetic actuator including a solenoid in addition to the magnetic switch. Thus, the starter can cost less.

The electromagnetic actuator includes a plunger, a stationary core, and a solenoid, wherein, when the solenoid is energized, the plunger moves toward the stationary core, and a shift lever linked between the plunger and the torque transmission member pushes the torque transmission member so as to move toward the ring gear, and wherein, when energization for the solenoid is stopped, the plunger and the torque transmission member receive force of a return spring in a their return direction. It is sufficient to electrically apply one-way movement force of the plunger and the torque transmission member that receive force in a return direction by a return spring. Consequently, the starter can cost less.

The torque transmission member is configured to slide on the output shaft of the starter motor, and the disengaging mechanism is a helical spline engagement part comprised of a helical spline on the inner periphery of the torque transmission member and a helical spline on the outer periphery of the output shaft of the starter motor, and these helical splines are meshed with each other. Therefore, the mesh between the ring gear and the pinion gear is automatically disengaged when the number of revolutions of the ring gear exceeds that of the pinion after the engine starts. Thus, the starter does not require a new power source and it can cost less.

Since the starter is used for an idle stop vehicle, the first embodiment is very effective with respect to the point that the engine can restart promptly.

The first embodiment also relates to a starter for an engine, comprising:

a starter motor rotated by current supplied;

a torque transmission member provided slidably on an output shaft of the starter motor, and which has a pinion mounted on an outer periphery of the output shaft and is capable of engaging and disengaging the pinion and a ring gear of the engine by sliding of itself on the output shaft;

a solenoid which generates driving force for sliding the torque transmission member to a place where the pinion meshes with the ring gear when current is supplied;

a helical spline engagement part comprised of a helical spline on the outer periphery of the output shaft and a helical spline on the inner periphery of the torque transmission member; these helical splines are meshed with each other and have inclination angles for making the sliding of the torque transmission member; and the helical splines slide the torque transmission member so as to get apart from the ring gear when the pinion is rotated by driving force from the ring gear; and a controller for energizing the solenoid to slide the torque transmission member so that the pinion meshes with the ring gear after the engine is stopped, wherein the inclination angles of the helical splines are set so as to maintain a state where the pinion and the ring gear mesh with each other during an engine stop mode, even when the solenoid is non-energized.

Consequently, only by setting the inclination angle of the helical spline in consideration of cogging torque of the starter motor and sliding resistance of the sliding parts, the ring gear and the pinion gear remain meshing in the engine stop mode. The inclination angle θ of the helical spline may be set to an angle satisfying a condition of $L>S/\tan\theta$, where L denotes the length of the mesh between the pinion and the ring gear and S denotes a length in which the torque transmission member can move due to a backlash.

The first embodiment relates to a starter for an engine, comprising:

a starter motor whose output shaft is rotated by current supplied;

a torque transmission member with a pinion for transmitting torque from an output shaft of the starter motor to a ring gear of the engine, and which is capable of transmitting and interrupting the torque by moving the pinion so as to mesh with and disengage from the ring gear;

an electromagnetic actuator for moving the torque transmission member to a place where the pinion meshes with the ring gear when current is supplied;

a disengaging mechanism for applying a driving force to the torque transmission member so that the torque transmission member moves to a place where the pinion is disengaged from the ring gear when the number of revolutions of the ring gear exceeds that of the torque transmission member; and a controller for energizing the electromagnetic actuator to move the torque transmission member so that the pinion meshes with the ring gear after rotation of a crankshaft of the engine completely stops, wherein the torque transmission member is configured to maintain a state where the pinion and the ring gear mesh with each other by a reaction of movement of the torque transmission member after the engine is stopped, even when the electromagnetic actuator is non-energized. Therefore, the starter can start the engine promptly and cost less since it does not require a newly provide electric motor such as a plunger stopper. Further, mountability to the vehicle can be also improved since the starter itself is not provided with the plunger stopper.

The controller energizes the electromagnetic actuator after a lapse of a predetermined time since a signal for stopping the engine is input. Thus, the pinion and the ring gear surely can mesh with each other.

In the first embodiment, the controller 5 controls so that the relay 51 is turned on to mesh the pinion gear with the ring gear 6 after the engine is stopped. Alternatively, the pinion gear may mesh with the ring gear 6 during a period after a signal for stopping the engine is input to the controller 5 and before the engine really stops. The engine rotates by inertia and the ring gear 6 also rotates at low speed without driven by the starter motor 1 during the above period. In this state, the pinion gear and the ring gear 6 can mesh with each other by moving the torque transmission member 2 toward the ring gear 6 without rotating the starter motor 1. The above method can reduce uncomfortable feeling of a vehicle driver caused by the driving of the starter motor 1 after the engine is stopped. Further, current consumption also can be reduced since the current supply to the armature coil 12 can be minimized.

The rotation state of the ring gear 6 varies according to the engine speed immediately before the engine stops. Therefore, the controller 5 takes in signal of engine speed when the signal for stopping the engine is input and may vary a timing of supplying current to the electromagnetic actuator 5 in accordance with the engine speed. In such a manner, the pinion gear and the ring gear 6 surely can mesh with each other.

In the first embodiment, it is determined whether the engine has completely stopped by using a lapse of the predetermined time since the signal for stopping the engine is input to the controller 5. It is also possible to determine it by using the rotational state of the engine. In this case, the relay 51 may be turned on after a sensor for sensing the rotational state of the engine senses the complete stop of rotation of the engine crankshaft. In this way, the pinion gear and the ring gear 6 can reliably mesh with each other.

Although the sensor 78 is provided for sensing mesh between the pinion gear and the ring gear 6 in the first embodiment, the sensor 78 may not be provided if amount of current supply time to the armature coil 12 required for the pinion gear to reliably mesh with the ring gear 6 is known by an experiment or the like.

Although the output shaft 17 of the starter motor 1 rotates integrally with the rotor 13 in the first embodiment, the rotation of the rotor 13 may be transmitted to the output shaft 17 provided separately from the rotor 13 by using a transmitting means such as a gear and a pulley.

Although the torque transmission member 2 is moved by the driving force of the magnetic switch 7 in the first embodiment, it is also possible to rotate the output shaft 17 of the starter motor 1 and move the pinion 22 to the ring gear 6 side by using the inertia force of the torque transmission member 2. With such a configuration, the magnetic switch 7 may not be provided.

Second Embodiment

Figure 9:
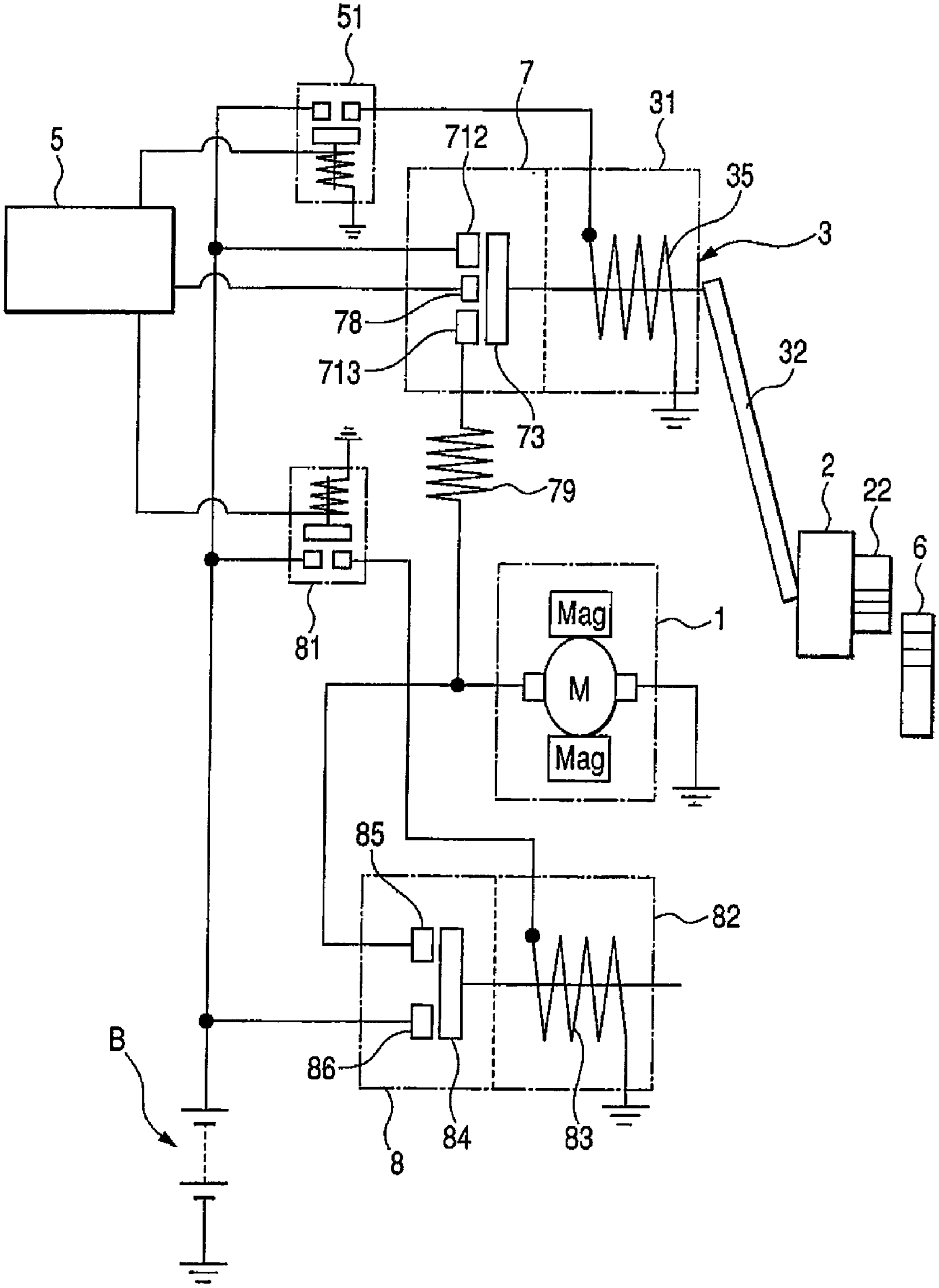
FIG. 9 is a diagram showing a circuit of a starter in a second embodiment.
Figure 10:
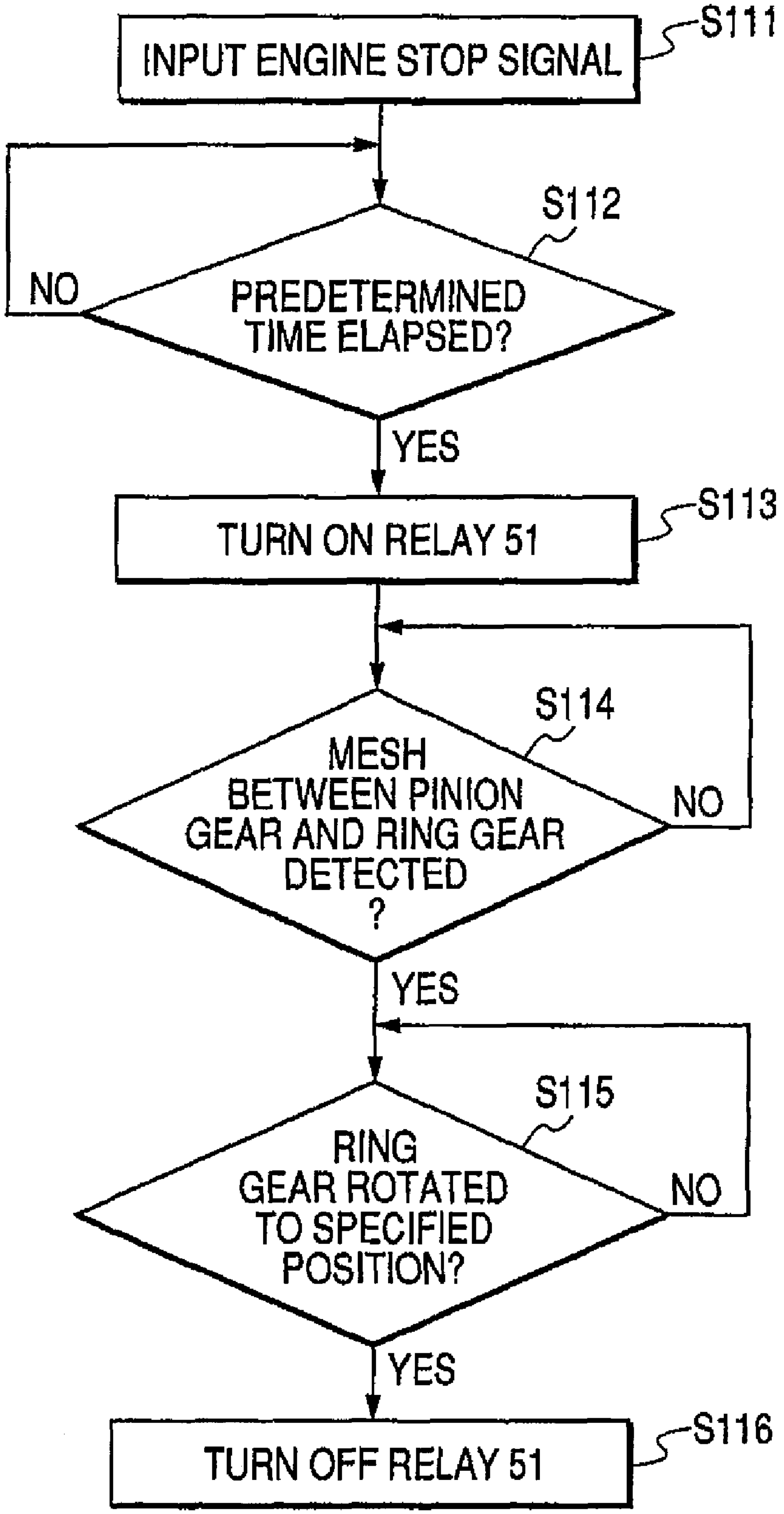
FIG. 10 is a control flowchart after the engine stops in the second embodiment.
Figure 11:
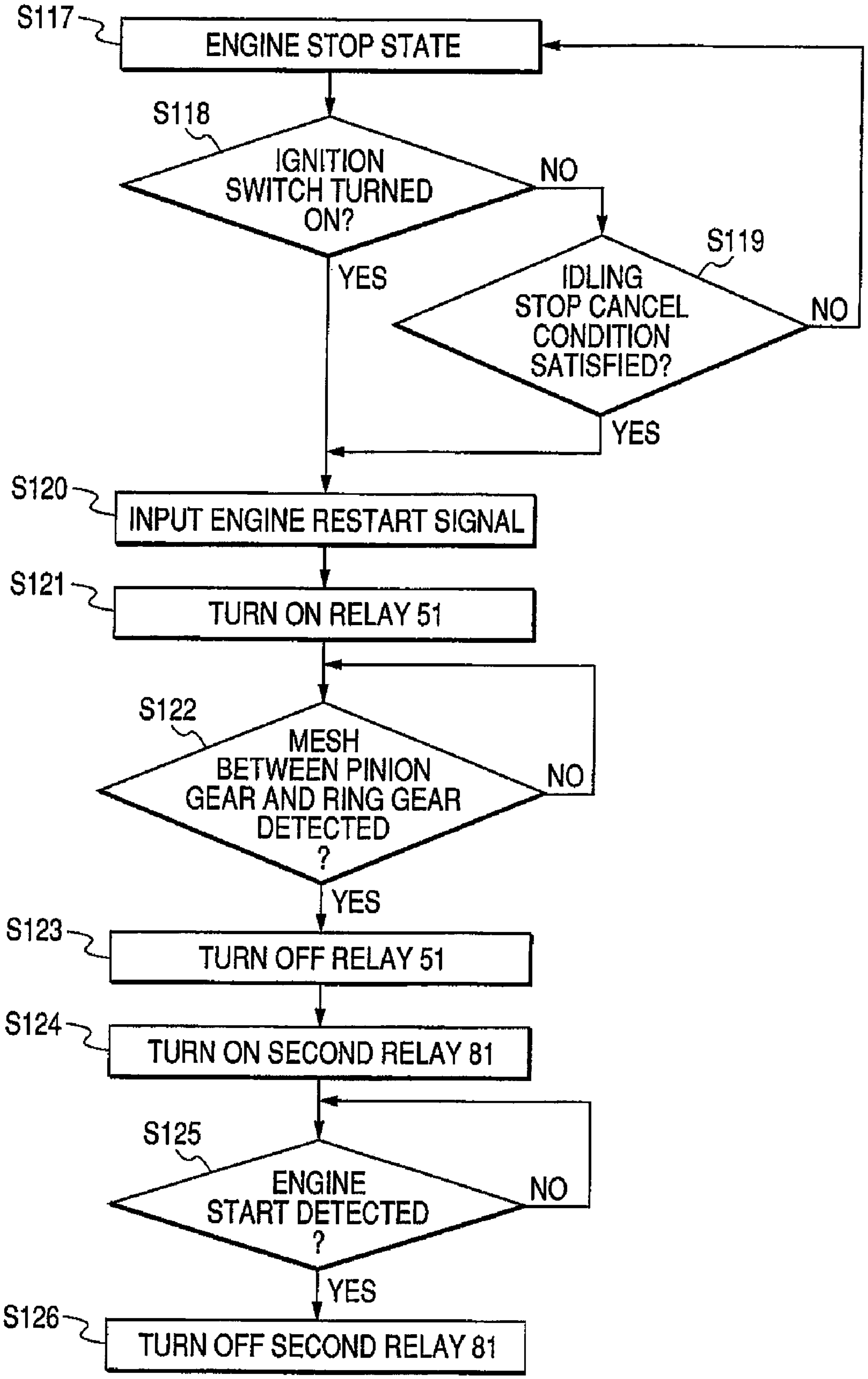
FIG. 11 is a control flowchart when the engine restarts in the second embodiment.

A second embodiment of the present invention will now be described with reference to FIGS. 9 to 11. FIG. 9 is a diagram showing a starter circuit of the second embodiment. FIG. 10 is a control flowchart performed after the engine is stopped in the second embodiment. FIG. 11 is a control flowchart performed when the engine restarts in the second embodiment. Parts common to those of the first embodiment will be referred to by the same names and the same reference numerals.

In the second embodiment, the movable contact 73 of the magnetic switch 7 comes into contact with the battery-side fixed contact 712 and the electric motor-side fixed contact 713 by the solenoid 31 of the electromagnetic actuator 3, and the current is supplied from the battery B to the starter motor 1. Unlike the first embodiment, a resistor 79 is provided between the electric motor-side fixed contact 713 and the starter motor 1. The resistance value of the resistor 79 is set so that the starter motor 1 is supplied with current where the output torque of the starter motor 1 becomes larger than the minimum load torque necessary to rotate the ring gear 6 and smaller than the maximum load torque necessary to rotate the ring gear 6. That is, the stator motor 1 cannot rotate the ring gear 6 by 360 degrees with the current supplied via the resistor 79.

In the second embodiment, a second magnetic switch 8 is provided in addition to the magnetic switch 7. Like the magnetic switch 7, the second magnetic switch 8 is driven by a second solenoid 82. Moreover, a second relay 81 is provided, which switches a conduction state and a non-conduction state between a coil 83 of the second solenoid 82 and the battery B. That is, when a conduction signal is output from the controller 5 to the second relay 81, current is supplied from the battery B to the second solenoid 83. Like the magnetic switch 7, a second movable contact 84 comes into contact with a second battery-side fixed contact 86 and a second electric motor-side fixed contact 85, and current is supplied from the battery B to the starter motor 1. Since no resistor is provided between the second electric motor-side fixed contact 85 and the starter motor 1, larger current flows than flows in the case where the movable contact 73 of the magnetic switch 7 comes into contact with the battery-side fixed contact 712 and the electric motor-side fixed contact 713. That is, the output torque of the starter motor 1 is larger that when the second magnetic switch 8 is turned on than that when the magnetic switch 7 is turned on. The ring gear 6 can be rotated by 360 degrees or more since the torque larger than the maximum torque necessary to rotate the ring gear 6 is output from the starter 1 when the second magnetic switch 8 is turned on.

As described above, the resistor 79 and the second magnetic switch 8 are provided in the second embodiment in addition to the components of the first embodiment. However, the resistor 79 and the second magnetic switch 8 are provided in positions separate from the starter shown in FIGS. 1 to 3, so that the structure of the starter itself is similar to that in the first embodiment.

The operation of the second embodiment will now be described with reference to the control flowchart of FIG. 8. Since the structure of the starter is almost the same as that in the first embodiment, it will be described with reference to FIGS. 1 to 3.

First, when the engine is in the operating state, no current is supplied to the solenoid 35 and the second solenoid 83 since there lays 51 and 81 are in then on-conduction state. Therefore, the shift lever 32 does not push the torque transmission member 2 and the pinion 22 is apart from the ring gear 6. The movable contact 73 is also apart from the battery-side fixed contact 712 and the electric motor-side fixed contact 713. Thus, no current is also supplied to the armature coil 12 of the starter motor 1.

The engine is stopped in the following two cases. One case is that in which an ignition switch is turned off. Another case is that in which an idle stop condition (a condition of automatic engine stop) is satisfied. The condition of the latter is that the engine speed continues the idling speed for a predetermined time from when the vehicle is stopped. In the case of the idle stop, a signal is input to the controller 5 to stop the engine in step S111 in FIG. 10 and the program advances to step S112.

In step S112, it is determined whether the predetermined time for the engine to completely stop has elapsed or not. When the predetermined time has elapsed, the program advances to step S113, where a signal for making the relay 51 conductive is output from the controller 5, and a state between the battery B and the solenoid 35 becomes conductive. By supplying current to the solenoid 35, the shift lever 32 works as the plunger 33 moves and the torque transmission member 2 with the pinion 22 moves toward the ring gear 6 as in the first embodiment.

When the positions of the teeth of the ring gear 6 and those of the pinion 22 match each other, the ring gear 6 and the pinion 22 mesh with each other, and the torque transmission member 2 stops by the action that the pinion 22 comes in contact with the stopper 113. However, when they do not match, the pinion 22 comes into contact with the one end surface of the ring gear 6 and stops there while being pressed against. Since the sensor 78 is provided for sensing whether the pinion 22 is in contact with the stopper 113 or not, in the case where the pinion gear meshes with the ring gear 6, a signal is output to the controller 5 and the mesh between the pinion 22 and the ring gear 6 is sensed in step S114. When a signal indicating that the pinion gear meshes with the ring gear 6 is input to the controller 5, the program advances to step S115. When the above signal is not input to the controller 5, the current is continuously supplied to the solenoid 35.

With the current supply to the solenoid 35, the movable contact 73 comes into contact with the battery-side fixed contact 712 and the electric motor-side fixed contact 713, and current is supplied from the battery B to the starter motor 1. However, since the resistor 79 is provided between the electric motor-side fixed contact 713 and the starter motor 1, preliminary energization namely small current supply to the starter motor 1 is performed.

With the preliminary energization, the torque of the output shaft 17 of the starter motor 1 is transmitted to the pinion 22. At the time when the teeth of the pinion gear and those of the ring gear 6 match, the pinion 22 moves in the axial direction to come into contact with the stopper 113, so that the pinion gear and the ring gear 6 mesh with each other. As a result of the above operation, a signal indicating that the pinion gear meshes with the ring gear 6 is output from the sensor 78 to the controller 5. After this, the program advances to step S115.

Although the pinion 22 rotates by the preliminary energization, the starter motor 1, where small current passes, rotates with torque slightly smaller than the maximum load torque necessary to rotate the ring gear 6.

Consequently, the output torque of the starter motor 1 is too small to rotate the ring gear 6 at an angle of the ring gear 6 where the rotation load of the engine is the maximum, and the pinion 22 stops rotating at that position.

In step S115, it is determined whether the ring gear 6 is rotated up to a specified position or not. When the ring gear 6 is rotated up to the specified position, the program advances to step S116, where the relay 51 is turned off and current supply to the solenoid 35 is stopped. If the ring gear 6 is not rotated up to the specified position in step S115, the relay 51 continues the on state.

The specified position of the ring gear 6 corresponds to a position where a piston is on the top dead center side from a middle position between the bottom dead center and the top dead center in a compression stroke of the engine. Preferably, the position is slightly before the top dead center. In the engine, the load acts at the maximum to the crankshaft when the piston is at a position just before the top dead center in the compression stroke in which an intake valve and an exhaust valve are closed. The starter motor 1 stops by the preliminary energization at the position just before the top dead center of the piston in the compression stroke. In step S115, it is unnecessary to particularly provide a sensor to determine the position of the ring gear 6. The position of the ring gear 6 can be also determine by a crank angle sensor for sensing the crank angle of the engine or by a cam angle sensor for sensing the angle of the camshaft, which are originally attached to the engine. In an engine with a plurality of cylinders, the positions of pistons in the cylinders are different from each other. In this case, the load torque is the maximum in an average position of the pistons between the bottom dead center and the top dead center in the compression stroke.

As described above in the second embodiment, the ring gear 6 stops at the position where the load on the engine becomes the maximum. Consequently, the crank shaft hardly rotates after the engine is stopped. The pinion gear and the ring gear 6 maintain meshing with each other even without current supply to the solenoid 35 and, unlike in the first embodiment, without increasing the inclination angle of the helical teeth of the helical spline engagement part.

The processes to restart the engine from a stop state will be described with reference to the flowchart of FIG. 11. The engine is at a stop in step S117. It is determined in step S118 whether or not the ignition switch is turned on. When the ignition switch is turned on, the program advances to step S120, where a signal to restart the engine is input to the controller 5. When the ignition switch is not turned on in step S118, the program advances to step S119 and it is determined whether a condition to cancel idle stop is satisfied. When the condition is satisfied, the program advances to step S120. When the condition is not satisfied, the program returns to step S117, where the engine remains stopping.

When the signal to restart the engine is input to the controller 5 in step S120, the program advances to step S121, where the relay 51 is turned on. Further, the sensor 78 senses whether the pinion gear and the ring gear 6 mesh with each other or not in S122. When they mesh with each other, the program advances to step S123, where the relay 51 is turned off. When they do not mesh with each other, the relay 51 continues the on state. In the case of the second embodiment, where the pinion gear and the ring gear 6 mesh with each other when the engine stops, the steps S121 to S123 may be omitted. However, the steps S121 to S123 are provided for safety since the engine cannot be restarted if the mesh between the pinion gear and the ring gear 6 is disengaged for some reason.

After the step S123, the program advances to step S124, where the second relay 81 is turned on. Consequently, a state between the battery B and the second solenoid 83 becomes conductive, and current is supplied to the second solenoid 83. The second movable contact 84 comes into contact with a second battery-side fixed contact 86 and a second electric motor-side fixed contact 85, resulting that the battery B supplies current to the armature coil 12 of the starter motor 1. The output shaft 17 of the starter motor 1 rotates, and the pinion 22 and the ring gear 6 rotate.

In step S125, whether the engine has started or not is determined. When the engine has started, the program advances to step S126, where the second relay 81 is turned off and current supply to the second solenoid 83 and the armature coil 12 is stopped. As for the means to determine whether the engine has started or not, sensing the engine speed may be employed as in the first embodiment. When the engine speed continues to be equal to a predetermined one or more for a predetermined time, the engine is considered to have started.

Although not shown in the flowchart of FIG. 11, when the engine does not start easily in step S125, the second relay 81 is turned off after a lapse of predetermined time and turned on again in order not to let the voltage of the battery B drop.

The above operation is repeated a few times. If the engine does not start after the operations, a warning is output to indicate malfunction.

In the case where a driver of the vehicle tries to start the engine by turning on the ignition switch, the ignition switch is turned off and the second relay 81 is also turned off.

The structure and operation of the second embodiment have been described above. The main points and advantages of the second embodiment will be described below.

A second embodiment relates to a starter for an engine, comprising:

a starter motor whose output shaft is rotated by current supplied;

a torque transmission member with a pinion for transmitting torque from an output shaft of the starter motor to a ring gear of the engine, and which is capable of transmitting and interrupting the torque by moving the pinion so as to mesh with and disengage from the ring gear;

an electromagnetic actuator for moving the torque transmission member to a place where the pinion meshes with the ring gear when current is supplied;

a disengaging mechanism for applying a driving force to the torque transmission member so that the torque transmission member moves to a place where the pinion is disengaged from the ring gear when the number of revolutions of the ring gear exceeds that of the torque transmission member; and a controller for energizing the electromagnetic actuator to move the torque transmission member so that the pinion meshes with the ring gear after the engine is stopped, wherein the engine is set to stop in a state where the pinion meshes with the ring gear and a piston is in a way from a bottom dead center to a top dead center in a compression stroke. Thus, the engine can start promptly. Even if a conventional starter is used, the pinion and the ring gear maintain meshing with each other since the ring gear stops at a position where load torque is largest.

Although a new magnetic switch is required to stop the ring gear at the position where the load torque is large, the magnetic switch does not need to be integrally provided with the starter. Therefore, mountability to a vehicle can be improved.

Preferably, the engine is set to stop when the piston is at a position of the top dead center side from a middle position between the bottom dead center and the top dead center. More preferably, the engine is set to stops when the piston is just before the top dead center. With the above configuration, the pinion and the ring gear remain meshing more reliably.

In the second embodiment, the starter motor is restarted from in a state where the engine has stopped and the pinion has meshed with the ring gear, in addition, with torque smaller than maximum load torque for rotating the engine and larger than minimum load torque for rotating the engine. Therefore, the ring gear can be easily stopped at a specified position.

Current supply to the starter motor is stopped when the starter motor has not rotated in spite of the fact that the starter motor has been supplied with current after the engine is stopped. In such a manner, the ring gear can be more easily stopped at the specified position.

The starter may further comprising include a crank angle sensor for sensing a crank angle of the engine. Current supply to the starter motor is stopped in a state where the crank angle at which rotation of the starter motor stops in spite of the fact that the start motor has been supplied with current, is in a way from the bottom dead center to the top dead center. With the above configuration, the pinion and the ring gear can maintain meshing with each other more reliably. The starter may comprise a cam angle sensor for sensing a cam angle of the engine. current supply to the starter motor is stopped in a state where the cam angle at which rotation of the starter motor stops in spite of the fact that the start motor has been supplied with current, is in a compression stroke of the engine. In this case as well, the pinion and the ring gear can maintain meshing with each other more reliably. From the viewpoint of reliability, it is preferable that the position of the ring gear is determined from information of both the crank angle sensor and the cam angle sensor.

Two magnetic switches are used in the second embodiment. However, a single magnetic switch can stop the ring gear at a position where the piston is near the top dead center in the compression stroke by feeding back the rotation position of the ring gear to the controller if it is possible to determine the position of the ring gear and whether the engine is in a compression stroke or not by the crank angle sensor, the cam angle sensor, and the like. In the case where information of the sensors is not used, a single magnetic switch can stop the ring gear at a position where the piston is near the top dead center in the compression stroke if current supplied to the starter motor can be varied by PWM (Pulse Width Modulation) control or the like.

Figure 12:
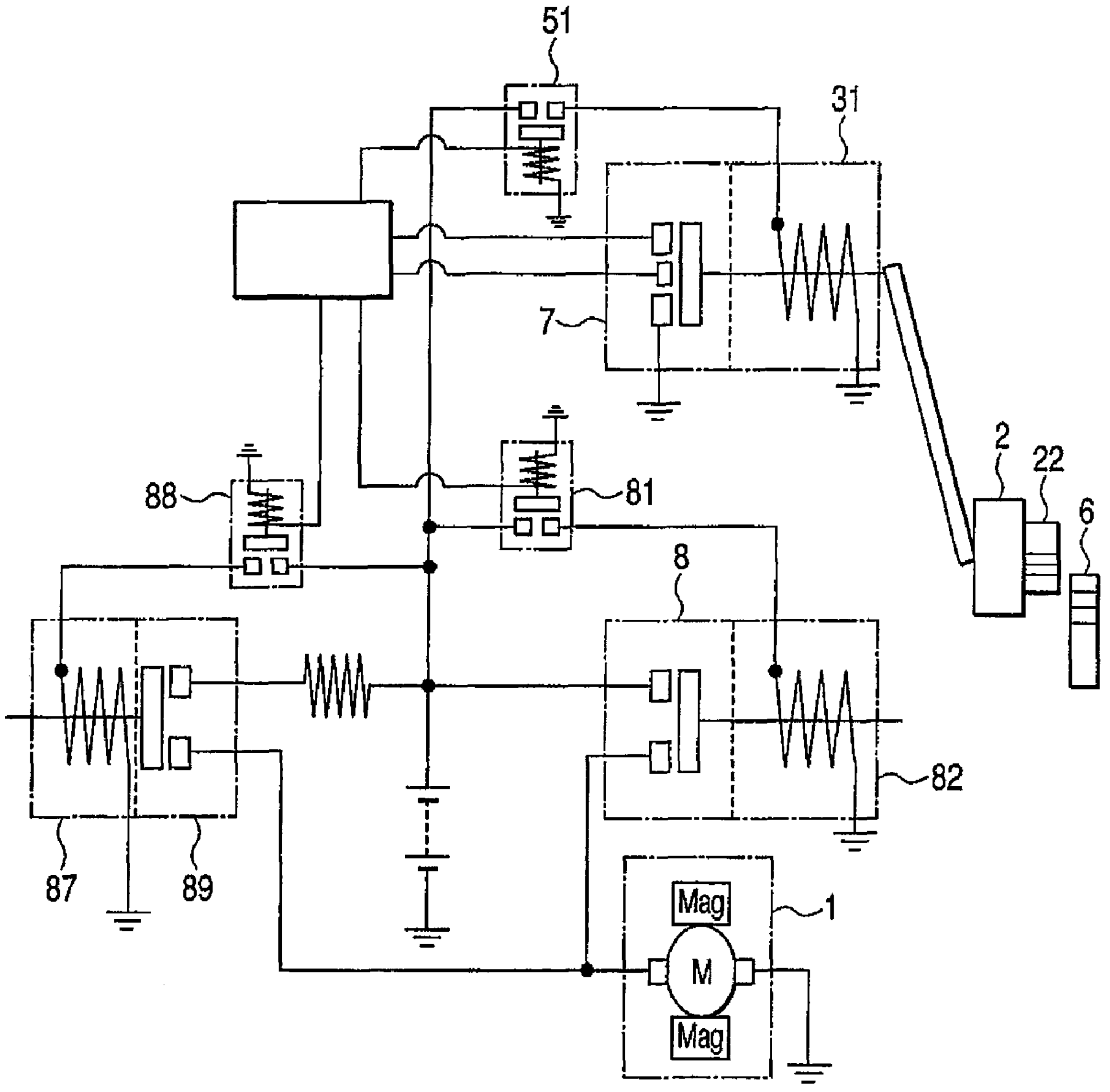
FIG. 12 is a diagram showing a circuit of a starter in a modification of the second embodiment.

As a modification of the second embodiment, a third solenoid 87, a third magnetic switch 89, and a third relay 88 may be used in addition to the configuration in the second embodiment in the case where, as shown in FIG. 12, the timing of moving the pinion 22 and the timing of rotating the output shaft 17 of the starter motor 1 need to be set arbitrarily. With such a configuration, it is possible to perform fine adjustment and reduce uncomfortable feeling of a vehicle driver as much as possible.

What is claimed is:

1. A starter for an internal combustion engine, comprising:

a starter motor whose output shaft is rotated by current supplied;

a torque transmission member with a pinion for transmitting torque from an output shaft of the starter motor to a ring gear of the engine, and which is capable of transmitting and interrupting the torque by moving the pinion so as to mesh with and disengage from the ring gear;

an electromagnetic actuator for moving the torque transmission member to a place where the pinion meshes with the ring gear when current is supplied;

a disengaging mechanism for applying a driving force to the torque transmission member so that the torque transmission member moves to a place where the pinion is disengaged from the ring gear when the number of revolutions of the ring gear exceeds that of the torque transmission member; and a controller for energizing the electromagnetic actuator to move the torque transmission member so that the pinion meshes with the ring gear after the engine is stopped, wherein the torque transmission member is configured to maintain a state where the pinion and the ring gear mesh with each other during an engine stop mode by movement resistance of the torque transmission member, even when the electromagnetic actuator is non-energized.

2. The starter according to claim 1, wherein the torque transmission member is comprised of: the pinion mounted around an outer periphery of the output shaft of the starter motor; a sleeve mounted around the outer periphery of the output shaft so as to be able to move in an axial direction while rotating together with the output shaft; and a one way clutch which is interposed between the sleeve and the pinion to transmit the torque only in a one-way rotational direction from the sleeve to the pinion, and wherein, when the number of revolutions of the ring gear exceeds that of the torque transmission member, low torque is also transmitted from the pinion to the sleeve by sliding resistance in the one-way clutch.

3. The starter according to claim 1, wherein the electromagnetic actuator is driven with a magnetic switch for switching between a conduction state and a non-conduction state of the starter motor and the battery.

4. The starter according to claim 3, wherein the electromagnetic actuator includes a plunger, a stationary core, and a solenoid, wherein, when the solenoid is energized, the plunger moves toward the stationary core, and a shift lever linked between the plunger and the torque transmission member pushes the torque transmission member so as to move toward the ring gear, and wherein, when energization for the solenoid is stopped, the plunger and the torque transmission member receive force of a return spring in a their return direction.

5. The starter according to claim 1, wherein the torque transmission member is configured to slide on the output shaft of the starter motor, and wherein the disengaging mechanism is a helical spline engagement part comprised of a helical spline on the inner periphery of the torque transmission member and a helical spline on the outer periphery of the output shaft of the starter motor, and these helical splines are meshed with each other.

6. The starter according to claim 1, wherein the controller controls the electromagnetic actuator to move the torque transmission member so that the pinion meshes with the ring gear also before the engine completely stops.

7. The starter according to claim 1, wherein the starter is used for a vehicle with an idle stop function.

8. A starter for an internal combustion engine, comprising:
a starter motor rotated by current supplied;
a torque transmission member provided slidably on an output shaft of the starter motor, and which has a pinion mounted on an outer periphery of the output shaft and is capable of engaging and disengaging the pinion and a ring gear of the engine by sliding of itself on the output shaft;
a solenoid which generates driving force for sliding the torque transmission member to a place where the pinion meshes with the ring gear when current is supplied;
a helical spline engagement part comprised of a helical spline on the outer periphery of the output shaft and a helical spline on the inner periphery of the torque transmission member; these helical splines are meshed with each other and have inclination angles for making the sliding of the torque transmission member; and the helical splines slide the torque transmission member so as to get apart from the ring gear when the pinion is rotated by driving force from the ring gear; and
a controller for energizing the solenoid to slide the torque transmission member so that the pinion meshes with the ring gear after the engine is stopped,
wherein the inclination angles of the helical splines are set so as to maintain a state where the pinion and the ring gear mesh with each other during an engine stop mode, even when the solenoid is non-energized.

9. The starter according to claim 8,
wherein the inclination angle θ of the helical splines are set to an angle satisfying a condition of $L>S/\tan\theta$, where L denotes a length of the mesh between the pinion and the ring gear and S denotes a length in which the torque transmission member can move due to a backlash.

10. A starter for an internal combustion engine, comprising:
a starter motor whose output shaft is rotated by current supplied;
a torque transmission member with a pinion for transmitting torque from an output shaft of the starter motor to a ring gear of the engine, and which is capable of transmitting and interrupting the torque by moving the pinion so as to mesh with and disengage from the ring gear;
an electromagnetic actuator for moving the torque transmission member to a place where the pinion meshes with the ring gear when current is supplied;
a disengaging mechanism for applying a driving force to the torque transmission member so that the torque transmission member moves to a place where the pinion is disengaged from the ring gear when the number of revolutions of the ring gear exceeds that of the torque transmission member; and
a controller for energizing the electromagnetic actuator to move the torque transmission member so that the pinion meshes with the ring gear after rotation of a crankshaft of the engine completely stops,
wherein the torque transmission member is configured to maintain a state where the pinion and the ring gear mesh with each other by a reaction of movement of the torque transmission member after the engine is stopped, even when the electromagnetic actuator is non-energized.

11. The starter according to claim 10,
wherein the controller energizes the electromagnetic actuator after a lapse of a predetermined time since a signal for stopping the engine is input.

12. The starter according to claim 11,
wherein the controller takes in signal of engine speed when the signal for stopping the engine is input and varies a timing of supplying current to the electromagnetic actuator in accordance with the engine speed.

13. The starter according to claim 10,
wherein the controller determines the complete stop of rotation of a crankshaft by a sensor for sensing a rotational state of the engine and, after that, energizes to the electromagnetic actuator.

14. A starter for an internal combustion engine, comprising:
a starter motor whose output shaft is rotated by current supplied;
a torque transmission member with a pinion for transmitting torque from an output shaft of the starter motor to a ring gear of the engine, and which is capable of transmitting and interrupting the torque by moving the pinion so as to mesh with and disengage from the ring gear;
an electromagnetic actuator for moving the torque transmission member to a place where the pinion meshes with the ring gear when current is supplied;
a disengaging mechanism for applying a driving force to the torque transmission member so that the torque transmission member moves to a place where the pinion is disengaged from the ring gear when the number of revolutions of the ring gear exceeds that of the torque transmission member; and
a controller for energizing the electromagnetic actuator to move the torque transmission member so that the pinion meshes with the ring gear after the engine is stopped,
wherein the engine is set to stop in a state where the pinion meshes with the ring gear and a piston is in a way from a bottom dead center to a top dead center in a compression stroke.

15. The starter according to claim 14,
wherein the engine is set to stop when the piston is at a position of the top dead center side from a middle position between the bottom dead center and the top dead center.

16. The starter according to claim 15,
wherein the engine is set to stops when the piston is just before the top dead center.

17. The starter according to claim 14,
wherein, the starter motor is restarted from in a state where the engine has stopped and the pinion has meshed with the ring gear, in addition, with torque smaller than maximum load torque for rotating the engine and larger than minimum load torque for rotating the engine.

18. The starter according to claim 17,
wherein current supply to the starter motor is stopped when the starter motor has not rotated in spite of the fact that the starter motor has been supplied with current after the engine is stopped.

19. The starter according to claim 18, further comprising a crank angle sensor for sensing a crank angle of the engine,
wherein current supply to the starter motor is stopped in a state where the crank angle at which rotation of the starter motor stops in spite of the fact that the start motor has been supplied with current, is in a way from the bottom dead center to the top dead center.

20. The starter according to claim 18, further comprising a cam angle sensor for sensing a cam angle of the engine,
wherein current supply to the starter motor is stopped in a state where the cam angle at which rotation of the starter motor stops in spite of the fact that the start motor has been supplied with current, is in a compression stroke of the engine.

* * * * *